(12) United States Patent
McClure et al.

(10) Patent No.: US 7,478,523 B2
(45) Date of Patent: Jan. 20, 2009

(54) PICKUP GUARD MOUNTING ARRANGEMENT

(75) Inventors: John R. McClure, New Holland, PA (US); David M. DeChristopher, Akron, PA (US)

(73) Assignee: CNH America LLC, New Holland, PA (US)

( * ) Notice: Subject to any disclaimer, the term of this patent is extended or adjusted under 35 U.S.C. 154(b) by 490 days.

(21) Appl. No.: 11/262,440

(22) Filed: Oct. 28, 2005

(65) Prior Publication Data

US 2007/0107402 A1    May 17, 2007

(51) Int. Cl.
*A01D 43/02* (2006.01)
*A01D 89/00* (2006.01)
(52) U.S. Cl. ........................................................ 56/364
(58) Field of Classification Search ................... 56/364, 56/132, 372, 341, DIG. 9; 100/100; 198/513, 198/512
See application file for complete search history.

(56) References Cited

U.S. PATENT DOCUMENTS

| | | | |
|---|---|---|---|
| 1,877,519 A | * | 9/1932 | Macgregor ................... 56/364 |
| 2,527,887 A | | 10/1950 | Martin |
| 2,682,743 A | * | 7/1954 | Hintz ........................... 56/364 |
| 2,893,537 A | * | 7/1959 | Krahn .......................... 198/513 |
| 3,226,921 A | * | 1/1966 | Shepley ....................... 56/364 |
| 3,397,527 A | | 8/1968 | Leuk et al. |
| 3,613,345 A | | 10/1971 | Cofer |
| 3,713,283 A | | 1/1973 | Fritz |
| 4,161,859 A | * | 7/1979 | Storm et al. .................. 56/364 |
| 4,411,127 A | | 10/1983 | Diederich, Jr. et al. |
| 4,524,576 A | * | 6/1985 | Probst ........................ 56/372 |
| 5,052,171 A | | 10/1991 | Bich et al. |
| 5,394,682 A | * | 3/1995 | Frimml et al. ................ 56/341 |
| 5,426,928 A | | 6/1995 | Frimml et al. |
| 6,295,797 B1 | | 10/2001 | Naaktgeboren et al. |
| 6,314,708 B1 | | 11/2001 | Engel |
| 6,314,709 B1 | | 11/2001 | McClure et al. |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A pickup for an agricultural harvester that employees C-shaped tine guards with a generally planar tine guide, the tine guide having a slot-like hook at the lower end thereof that fits into a slot on the tine guard and held in place by bolts in the upper end of the hook and the upper end of the tine guide.

10 Claims, 4 Drawing Sheets

PICKUP GUARD MOUNTING ARRANGEMENT

BACKGROUND OF THE INVENTION

The present invention relates to an agricultural pickup and, more particularly, to a pickup tine guard with an improved mounting.

Pickups used on agricultural harvesting machines such as, for example, balers and forage harvesters typically include a reel that is rotatable about a horizontal axis. The reel has a plurality of tines mounted on bars for movement in a generally circular path to lift crop material from the ground and feed it rearwardly into a crop processing mechanism. The tine bars are connected to a central shaft by end plates, and as the reel rotates, the tines project through spaces or gaps formed between tine guards arranged side-by-side transversely of the reel. These tine guards are individually secured by bolts at their top and bottom ends to support members on the pickup. U.S. Pat. No. 3,397,527 granted on Aug. 20, 1968 to O. W. Luek et al. discloses a conventional mounting arrangement for the tine guards wherein each guard is secured by four bolts or rivets at its top and bottom ends.

U.S. Pat. No. 5,052,171 granted on Oct. 1, 1991 to Gary L. Bich et al. discloses a tine mounting arrangement that comprises upper and lower mounting plates that are removably attached to upper and lower frame members, respectively, on the pickup. The pickup includes a reel having a plurality of tines that project, as the reel rotates, through spaces or gaps formed between the tine guards. The upper ends of the tine guards are secured to the upper mounting plate while the lower ends of the tine guards are secured to the lower mounting plate so that the tine guards are removed together with the mounting plates when the mounting plates are detached from the pickup frame members.

At some point in time every pickup requires service, whether it is due to normal wear and tear or because of damage, and such service necessitates the removal of one or more tine guards in order to gain access to the reel. This type of service is quite time consuming, and thus costly, because, in most such situations quite a few tine guards must be removed to provide enough space to perform additional service work. Particularly in situations where the tine guards themselves are damaged or that damage extends across the front of the pickup, the amount of time and effort that must be expended to disassemble the components to provide adequate access to effect repair is such that the costs are excessive.

Additionally, pickups of the nature described herein are placed under considerable stress during operation due to encounters with crop materials, stones, pieces of wood and the like. Such stresses are in generally exhibited as side and other bending forces that often damage the tine guards.

It would be a great advantage to provide a tine guard mounting arrangement that overcomes the above problems and disadvantages.

SUMMARY OF THE INVENTION

Accordingly, it is an object of the present invention to provide an improved tine guard mounting arrangement that avoids the above-noted disadvantages.

It is another object of the present invention to provide an agricultural harvester pickup attachment having an improved tine guard.

It is a further object of the present invention to provide an agricultural harvester windrow pickup attachment having an improved tine pickup assembly.

It is a further object of the present invention to provide an improved pickup tine guard that uses one bolt to mount the guard at the bottom.

It is a further object of the present invention to provide an improved pickup guard mounting assembly that has a hook in the tine guide strip that is inserted into a slot in the tine guard to help hold it in position.

It is a still further object of the present invention to provide an agricultural pickup where the tine guard and a hook on the guard interlock to strengthen the pickup to better endure bending and beam forces created by encounters with foreign objects.

It is an even still further object of the present invention to provide an agricultural pickup where the tine guard and a hook on the guard interlock to give sideways stability to the tine guide at the bottom.

It is another object of the present invention to provide an agricultural pickup that is easier to manufacture and less costly to assemble and disassemble.

These and other objects are achieved by providing a pickup for an agricultural harvester that employees C-shaped tine guards with a generally planar tine guide, the tine guide having a slot-like hook at the lower end thereof that fits into a slot on the tine guard and held in place by bolts in the upper end of the hook and the upper end of the tine guide.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
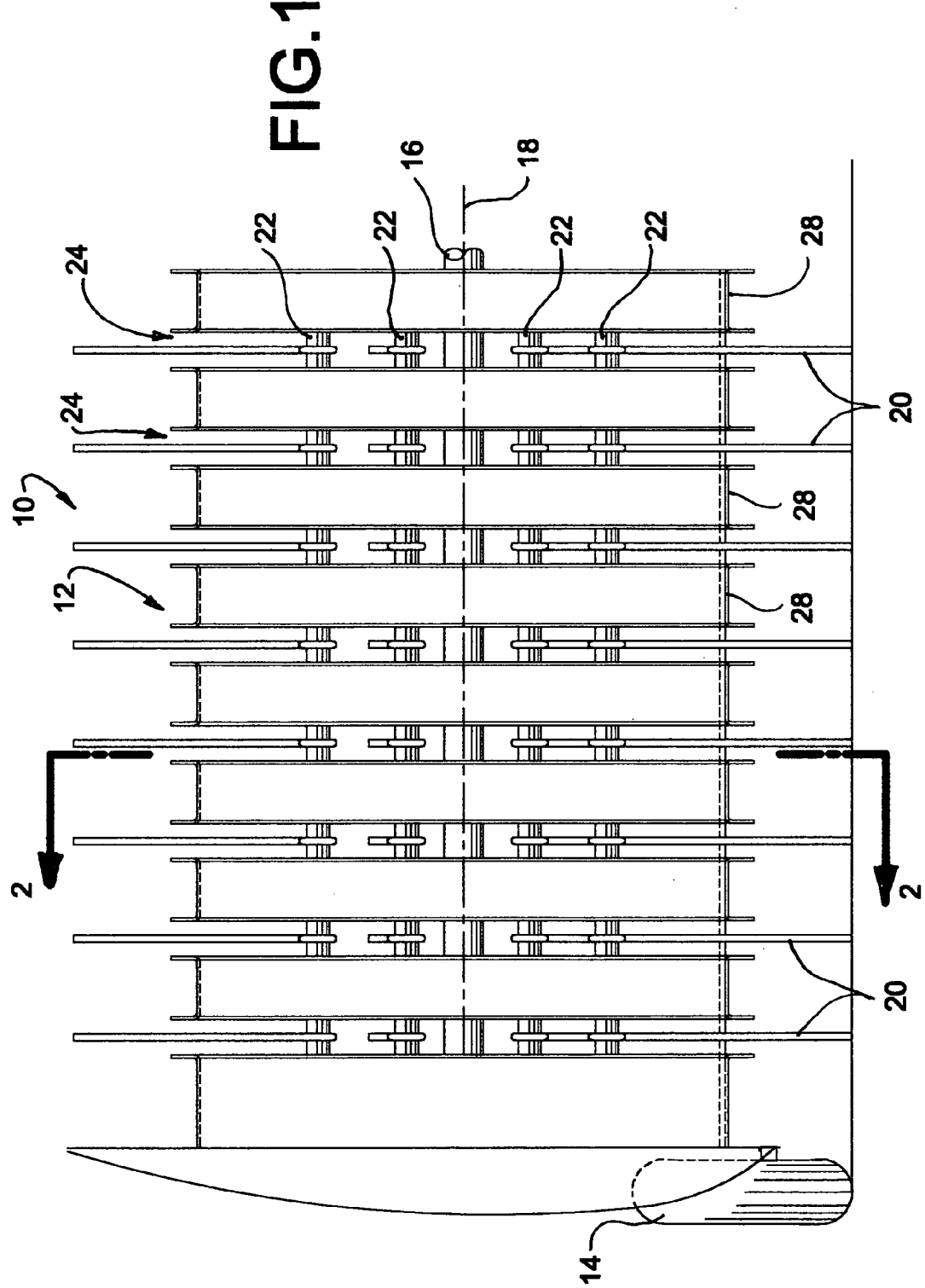
FIG. 1 is a partial front elevation view of a pickup for agricultural machines, incorporating a tine guard mounting arrangement according to the preferred embodiment of the present invention.
Figure 4:
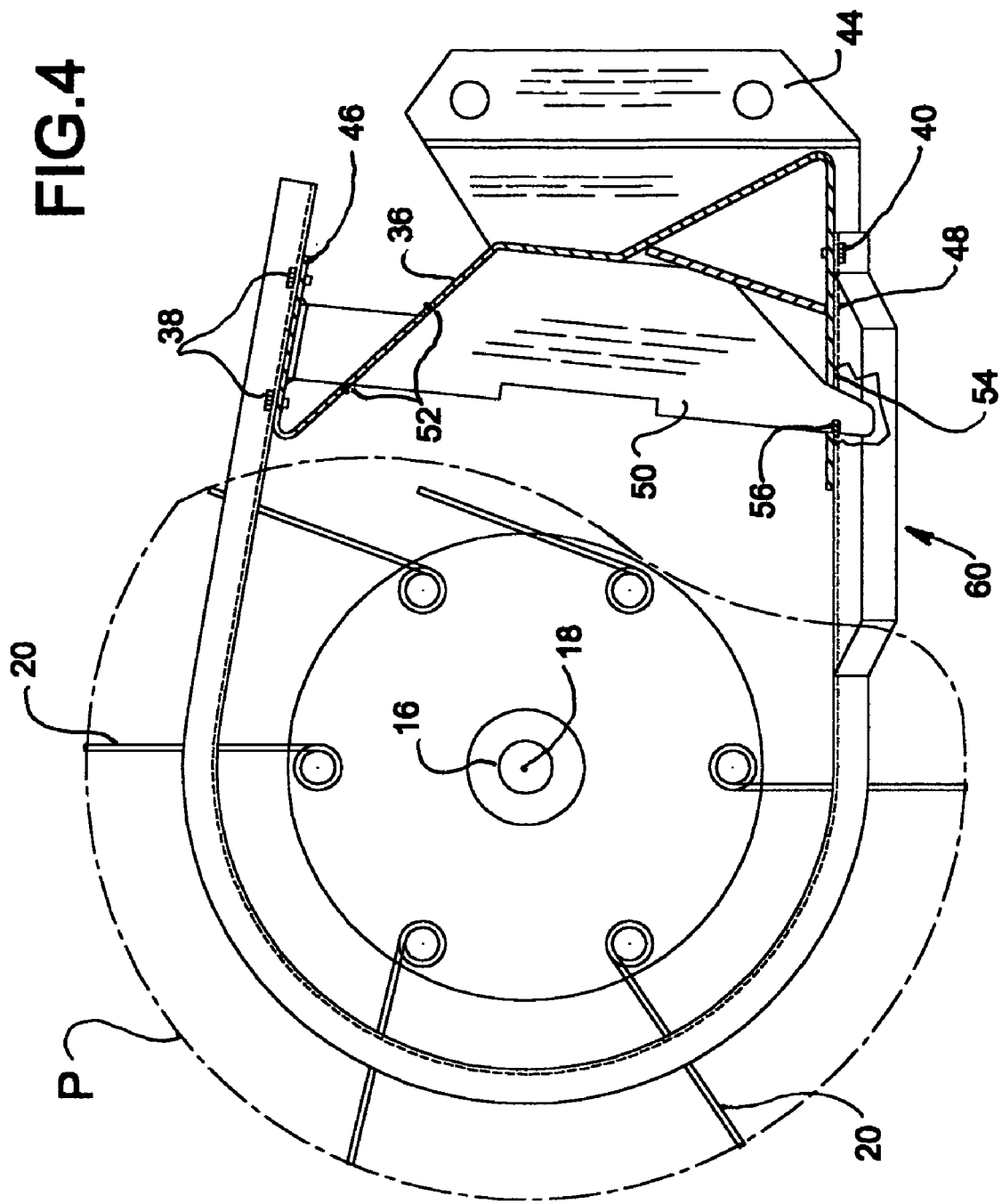
FIG. 4 is a view, similar to FIG. 3, showing a tine guard, tine guide strip and tee-pee section.

Referring to the figures, particularly FIGS. 1 and 4, a pickup 10 for agricultural machines such as balers and forage harvesters includes a reel 12 supported at one end by a wheel 14, and the other end by conventional means (not shown). The reel 12 has a central shaft 16 with a generally horizontal axis 18, and a plurality of tines 20 arranged in spaced apart rows along the length of the central shaft 16. The tines 20 are mounted on transverse bars 22 that extend between end plates (not shown) fixed to the shaft 16 adjacent the ends thereof. Conventional drive means such as chains and sprockets (not shown) are provided to rotate the central shaft 16 and thereby cause movement of the tines 20 in a predetermined path P, known in the art, in order to lift crop material from the ground.

Figure 2:
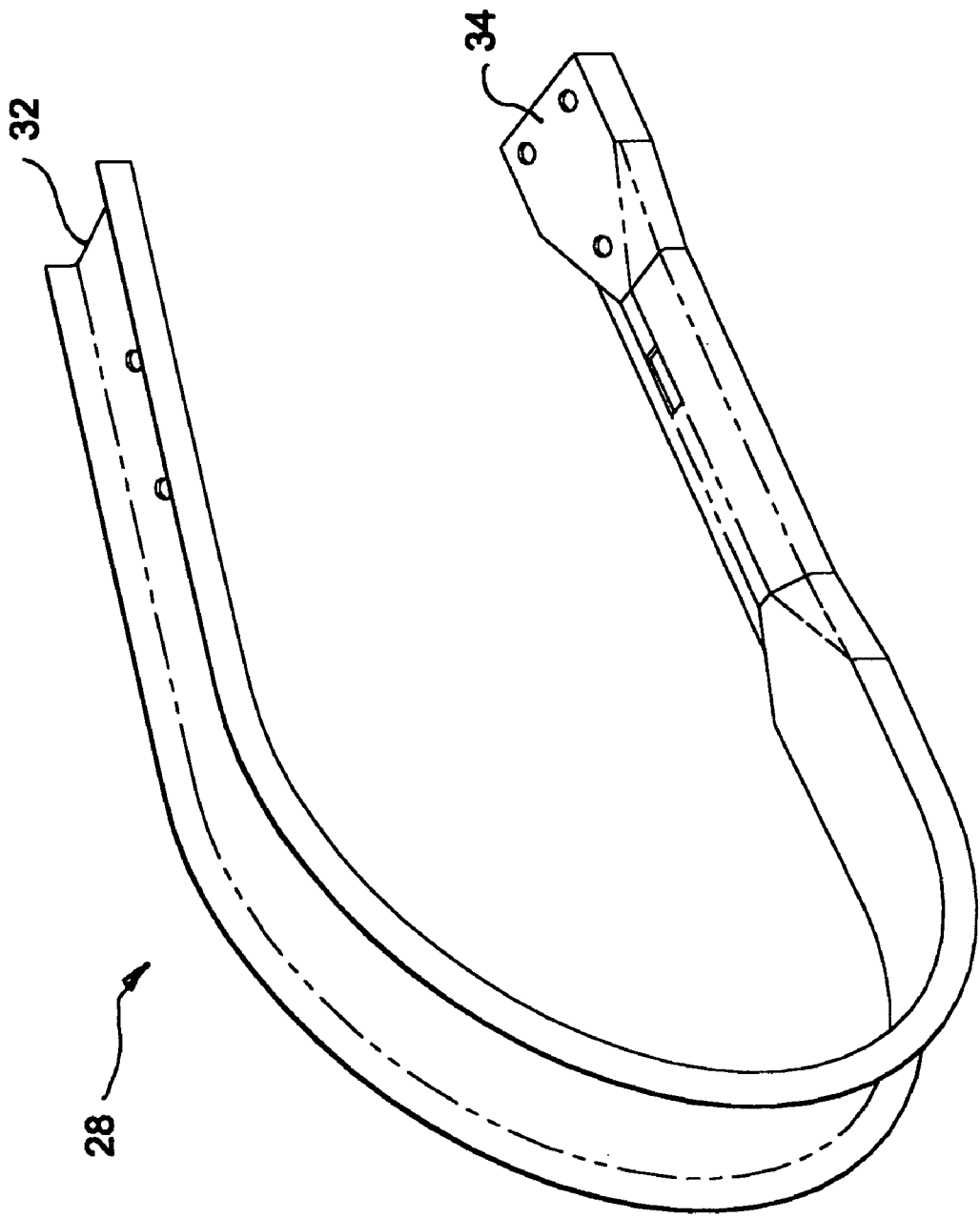
FIG. 2 is a sectional view, taken along lines 2-2 of FIG. 1.

As the tines 20 move along path P, they project through spaces or gaps 24 formed between a adjacent tine guards 28 that are arranged side-by-side transversely across the reel 12. Tine guards 28 are substantially C-shaped, as seen in FIG. 2, in side elevation and generally channel-shaped in cross section with their upper and lower end portions 32, 34, respectively, attached to bracket 36 (FIG. 4) by bolts 38, 40 (38 representing two bolts at the top and 40 representing three at the bottom, one each in holes 41,42 and 43). Bracket 36 is affixed, as by welding, to the pickup frame 44, and extends angularly from an upper generally flat portion 46 to a generally flat lower portion 48, such that the upper end 32 is generally above the lower end 34. An elongate tine guide strip 50 abuts flat upper portion 46 on one end, and is affixed thereto as by welding or bolting. and extends through a slot 52 in angled bracket 36, terminating at the other end with a narrowed section that extends through slot 54 in the tee-pee portion of tine guard 28. The lower end of tine guide 50 also contains a slot or hook 56 formed therein on the forward side thereof to be pushed onto the forward edge of slot 54. With the back edge of the tine guide 50 generally matching or filled to the general forward shape of bracket 36, and with a slight interference fit between the tine guide and the opening of the tine guard (i.e., the difference between the distance between the top edge of the tine guide and top of hook 56 and the distance between the top of slot 54 and the lower surface of upper flat portion 46) the tine guide 50 can be inserted and held in the position shown in FIGS. 2 and 4 in a generally rigid manner. The structure described permits, in an alternative preferred embodiment, only one hole and one bolt would be used to attach guard 28 to pickup frame 44, thus providing significant savings in assembly and maintenance time. Moreover, the structure is stiffened by the described tine guide to improve beam strength of the pickup and better endure bending forces due to adverse field operating conditions.

Figure 3:
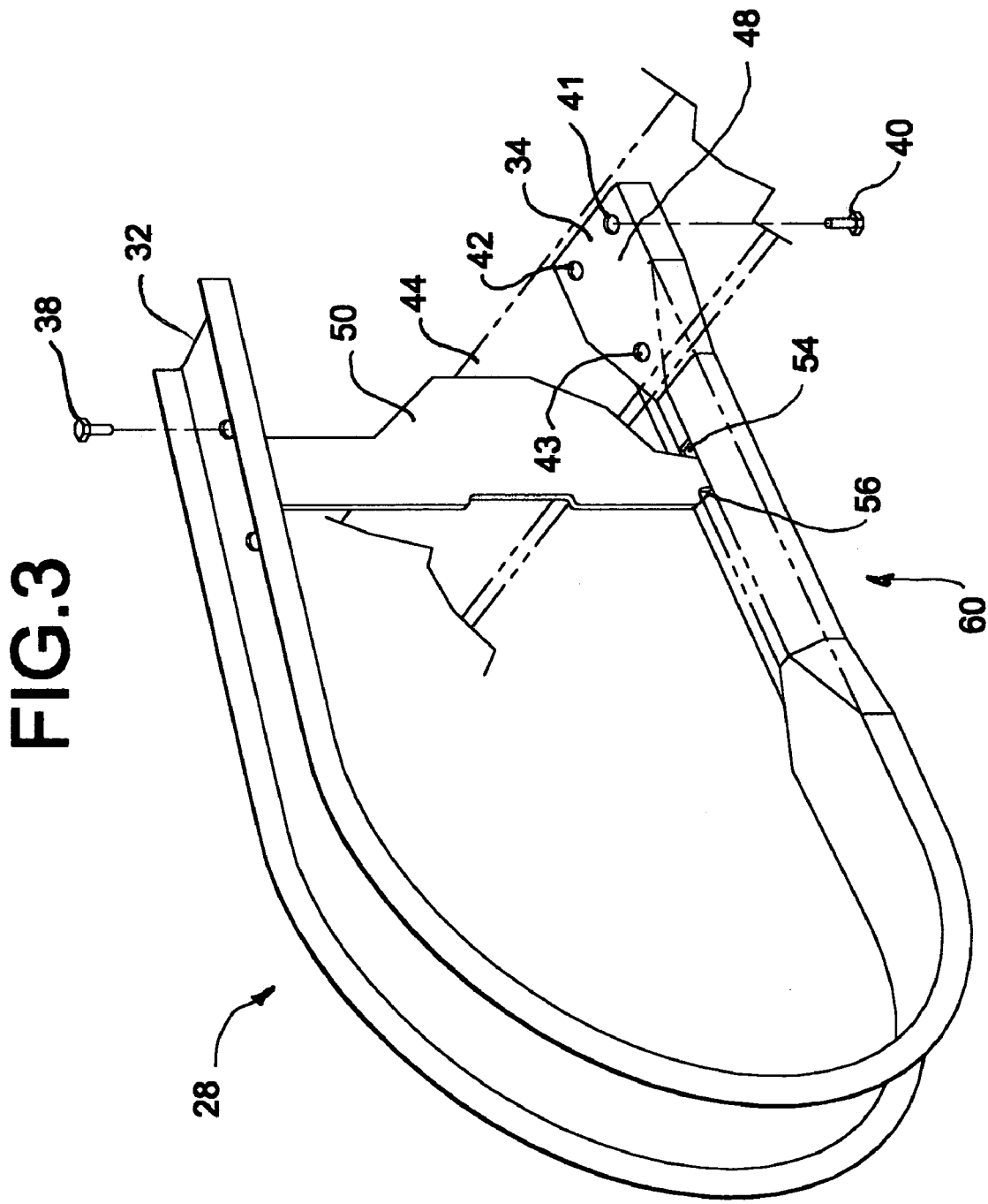
FIG. 3 is a partial perspective view of a tine guard, tine guide strip and tee-pee section of the assembly of the present invention, also showing the tine guard mounting holes.

A tee-pee section 60 of tine guard 28, best shown in FIGS. 3 and 4, is narrower than the channel portion and contains the slot 54 on the top edge thereof. The term "tee-pee" is generally indicative of the transverse cross-sectional shape of that portion of the tine guard. The relative width of the tee-pee section allows for a larger opening between adjacent tine guards at the lower part of the pickup to provide a more ready exit for crop material, broken tines and other debris. Moreover, the tee-pee section allows the mounting bolts to be at the back of the tine guard, allowing the guards to bend and absorb the shock when struck by an object.

This particular pickup tine guard mounting arrangement has manufacturing cost advantages in that it reduces the number of bolts required to fasten the tine guard in place and the tine guide does not require welding at the bottom. Furthermore, and every bit as important, the instant invention provides a significantly improvement in pickup strength and stability. When a prior art pickup hits an obstacle in the field the stress is focused in the transition area between the tee-pee section and the flat lower end portion of the tine guard. This is a relatively weak part of the structure and will buckle if the force is sufficient (excessive forces are not necessary to cause buckling). The tine guard 28 and hook 56 on the tine guide 50 interlock to tie into the strength of the tee-pee, significantly strengthening the overall structure, reducing bending or buckling by foreign objects and giving improved sideways stability to the guide at the bottom.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. An improved windrow pickup attachment for an agricultural harvesting machine having crop processing apparatus including an input opening for receiving crop material, the pickup attachment having a forward end and an opposing rearward end, the attachment comprising:

a pickup frame mountable on the front of the harvesting machine adjacent the input opening;

a transverse reel assembly mounted on the pickup frame for engaging and picking up the crop material from the ground;

the reel assembly including a series of tines and a plurality of generally C-shaped spaced apart side-by-side tine guards, the opening of each C-shaped tine guard facing rearwardly, respective ends thereof forming generally flat upper and lower end portions, the tines projecting outwardly between the tine guards for engaging crop material and urging it upwardly and rearwardly along the outer surfaces of the tine guards;

each C-shaped tine guard including a tee-pee section forwardly of and adjacent the flat lower end portion, the tee-pee section having a slot on the upper surface thereof generally facing the flat upper end portion of the guard;

a generally planar tine guide having a top end and an opposing bottom end, the top end having attachment means thereon affixed to the flat upper end portion of the tine guard and the bottom end having a forwardly directed slot-like hook therein, the geometry and relative positioning of the various components being such that at least a portion of the bottom end of the tine guard extends through the slot in the tee-pee section and the forwardly directed slot-like hook engages the forward edge of the slot in the tee-pee section, whereby each tine guide is held in place between the upper and lower end portions of the respective tine guard providing increased lateral and vertical stability and strength to the pickup attachment.

2. The attachment of claim 1, wherein:

the pickup frame includes an irregularly shaped, in front-to-back vertical cross-section, forwardly facing bracket having generally flat first and second ends spaced apart a distance generally equivalent to the distance between the upper and lower end portions of the C-shaped tine guards; and the upper end portion of each tine guard is affixed to the flat first end of the bracket and the lower end portion of each tine guard is affixed to the flat second end of the bracket.

3. The attachment of claim 2, wherein:

the irregularly shaped bracket includes a portion extending angularly across the vertical plane of the tine guide, the bracket having an elongate supporting slot therethrough through which the tine guide is positioned.

4. The attachment of claim 3, wherein:

the tine guide has a forward edge and an opposing rearward edge and the rearward edge is generally shaped the same as the irregularly shaped bracket and is in general contact therewith.

5. The attachment of claim 4, wherein:

the rearward edge of the tine guard, below the supporting slot is generally in full contact with the irregularly shaped bracket.

6. In a windrow pickup attachment for an agricultural harvesting machine having crop processing apparatus including an input opening for receiving crop material, the pickup attachment having a forward end and an opposing rearward end, the attachment including a pickup frame mountable on the front of the harvesting machine adjacent the input opening, the improvement wherein:

a transverse reel assembly mounted on the pickup frame for engaging and picking up the crop material from the ground;

the reel assembly including a series of tines and a plurality of generally C-shaped spaced apart side-by-side tine guards, the opening of each C-shaped tine guard facing rearwardly, respective ends thereof forming generally flat upper and lower end portions, the tines projecting outwardly between the tine guards for engaging crop material and urging it upwardly and rearwardly along the outer surfaces of the tine guards;

each C-shaped tine guard including a tee-pee section forwardly of and adjacent the flat lower end portion, the tee-pee section having a slot on the upper surface thereof generally facing the flat upper end portion of the guard;

a generally planar tine guide having a top end and an opposing bottom end, the top end having attachment means thereon affixed to the flat upper end portion of the tine guard and the bottom end having attachment means thereon affixed to the flat lower end portion of the tine guard; and wherein the attachment means on the bottom end portion of the guide comprises:

a forwardly directed slot-like hook in the tine guide, the geometry and relative positioning of the various components being such that at least a portion of the bottom end of the tine guard extends through the slot in the tee-pee section and the forwardly directed slot-like hook engages the forward edge of the slot in the tee-pee section, whereby each tine guide is held in place between the upper and lower end portions of the respective tine guard providing increased lateral and vertical stability to the pickup attachment.

7. The attachment of claim 6, wherein:

the pickup frame includes an irregularly shaped, in front-to-back vertical cross-section, forwardly facing bracket having generally flat first and second ends spaced apart a distance generally equivalent to the distance between the upper and lower end portions of the C-shaped tine guards; and the upper end portion of each tine guard is affixed to the flat first end of the bracket and the lower end portion of each tine guard is affixed to the flat second end of the bracket.

8. The attachment of claim 7, wherein:

the irregularly shaped bracket includes a portion extending angularly across the vertical plane of the tine guide, the bracket having an elongate supporting slot therethrough through which the tine guide is positioned.

9. The attachment of claim 8, wherein:

the tine guide has a forward edge and an opposing rearward edge and the rearward edge is generally shaped the same as the irregularly shaped bracket and is in general contact therewith.

10. The attachment of claim 9, wherein:

the rearward edge of the tine guard, below the supporting slot is generally in full contact with the irregularly shaped bracket.

\* \* \* \* \*